ދ,166,514
Patented Jan. 19, 1965

3,166,514
HYDROGEN GENERATION BY HYDROLYSIS OR ALCOHOLYSIS OF A POLYHYDROPOLYBO-RATE-GROUP VIII METAL MIXTURE
George W. Parshall, Newark, Del., assignor to E. I. du Pont de Nemours and Company, Wilmington, Del., a corporation of Delaware
No Drawing. Filed July 9, 1962, Ser. No. 208,646
22 Claims. (Cl. 252—188)

This invention relates to, and has as its principal objects provision of, certain novel polyhedral boron hydride mixtures capable of reacting with water or alcohols to liberate hydrogen and a process for producing hydrogen from the mixtures.

The hydrolysis of boron hydrides such as sodium borohydride to form hydrogen has been described in the literature. This reaction is useful as a source of hydrogen for special purposes, but the borohydrides have certain undesirable characteristics. In particular, they do not possess as great a stability as desired. For example, the known borohydrides hydrolyze rapidly in acidic solutions and, at best, are stable only when strongly alkaline. Moreover, some borohydrides are not stable enough to permit their isolation as ammonium and tertiary ammonium salts. It is therefore desirable to provide new boron hydride compositions that not only have improved stability but also are better sources of hydrogen.

The present invention provides new stable boron hydride compositions which are useful as concentrated sources of hydrogen. The novel compositions of this invention are solid mixtures of (a) polyhydropolyboric acids and their salts of the formula $M_a(B_xH_{y-z}X_z)_b$, wherein M is a cation, i.e., an atom or group of atoms which in aqueous solution forms a positively charged ion, having a valence of 1–3, inclusive; $a$ is a positive whole number between 1 and 4, inclusive; and $b$ is a positive whole number between 1 and 3, inclusive, whose values are determined by the valences of the anion and cation, respectively; $x$ and $y$ are positive numbers of at least 10, $z$ is a number between 0 and 6, inclusive, and the sum of $x$, $y$ and the valence of the polyhydropolyborate anion is a positive even number; and X is a halogen (i.e., a fluorine, chlorine, bromine or iodine), alkyl, aralkyl, hydroxyl, or alkoxy in which the alkyl or aralkyl groups contain 1–11 carbon atoms with (b) a catalytic amount of a metal of Group VIII of the Periodic Table having an atomic number between 28 and 78, inclusive, i.e., nickel, ruthenium, rhodium, palladium, osmium, iridium, or platinum, or of a compound of such a metal that is reduced to the metal under the reaction conditions. A preferred group of such compounds includes the acids, salts, and oxides of these particular metals.

This invention also includes the process of reacting a polyhydropolyborate of the formula $M_a(B_xH_{y-z}X_z)_b$, wherein the symbols have the meanings defined above, with water or an alcohol in the presence of a catalytic amount of a metal of Group VIII of the Periodic Table having an atomic number between 28 and 78, inclusive, or of a compound of such a metal that is reduced to the metal under the reaction conditions. It is believed that when such metal compounds are used in the process of this invention, they undergo initial reduction with the resultant metal acting as the actual catalyst.

The compositions of this invention can be prepared by simply mixing together dry a polyhydropolyborate of the above formula and a metal of Group VIII of the Periodic Table having an atomic number within the range defined above. The amount of the Group VIII metal catalyst can range from 0.01% to 100% or more, by weight, of the polyhydropolyborate compound. The particular amount of catalyst employed in any particular composition depends on the particular polyhydropolyborate compound being employed, the particular catalyst, the particular rate of reaction desired in the subsequent hydrolysis or alcoholysis of the composition, and on the particular reaction conditions to be employed, e.g., the pH of the reaction system and the temperature to be used in the hydrolysis step. In general, the rate of reaction increases with an increase in concentration of catalyst. The reaction itself is referred to herein as "hydrolysis," the term "hydrolysis" including "alcoholysis" also.

The hydrolysis of the polyhydropolyborate composition can be carried out by various procedures. In general, all that is necessary is to contact a polyhydropolyborate of the general formula given above with a catalyst of the type defined above in an aqueous or alcoholic medium. In one procedure the polyhydropolyborate compound is dissolved or dispersed in an aqueous medium, e.g., water alone or a mixture of water with another non-poisoning, liquid diluent such as an alcohol, an ether, an acid, etc. While water is the preferred component of the reaction medium, use of another nonpoisoning liquid diluent may be desirable, for example, to increase the solubility of some polyhydropolyboric acid compounds in the reaction medium. The concentration of the polyhydropolyborate compound in the reaction medium can be varied widely. It is usually desirable to employ at least the quantity of water stoichiometrically required to convert the polyhydropolyborate compound completely to hydrogen and boric acid (or a borate). Hydrolysis of the polyhydropolyboric acid compound is effected by adding to the aqueous dispersion a catalytic amount of the Group VIII metal catalyst, and, if necessary, heating the reaction mixture.

In another procedure the polyhydropolyborate compound is dissolved or dispersed in an alcohol, e.g., ethyl alcohol or t-butyl alcohol, and the reaction is carried out in the same general manner as when aqueous reaction media are used. In this embodiment the lower aliphatic alcohols are preferred. Specific alcohols that can be used include methyl, ethyl, isopropyl, n-butyl, t-butyl, amyl and n-hexyl alcohols.

As indicated above, the Group VIII metal catalyst can be used in amounts ranging from as low as 0.01% of the weight of the polyhydropolyborate to amounts of 100% or more. The smaller proportions are used when the most easily hydrolyzed polyhydropolyborate compounds are used, when the slowest evolution of hydrogen is desired, and when acidic reaction media are employed. On the other hand, the higher proportions of catalysts are used when less readily hydrolyzed polyhydropolyborates are employed, when neutral or alkaline reaction media are employed, and when impurities that tend to inhibit the hydrolysis are present in the reaction system. In most cases, the amount of catalyst employed ranges from 1% to about 10% of the weight of the polyhydropolyborate compound.

In another embodiment of the process of this invention, the polyhydropolyboric acid compound is mixed dry, preferably in a dry atmosphere, with the Group VIII metal catalyst in the absence of an aqueous reaction medium. The resulting uniform mixture is stored dry until it is wanted for generation of hydrogen. At this time all that is necessary is to add water, alcohol, or an aqueous reaction medium to the polyhydropolyborate-catalyst composition whereupon hydrolysis takes place at ordinary or elevated temperature and hydrogen is evolved.

The hydrolysis of the polyhydropolyboric acid compound is conveniently carried out at atmospheric pressure; however, subatmospheric or superatmospheric pressures can be employed if desired.

The rate of reaction is also dependent on the reaction temperature and increases with elevation of temperature. Reaction temperatures ranging from 0° to 100° C. or more are preferred.

As indicated above, the rate of reaction is much greater in acidic media than in neutral or alkaline media. Thus, adjustment of acidity affords a convenient way of controlling the rate of reaction. The pH of the reaction mixture can be lowered, i.e., the acidity increased, by adding any of a common acids in any desired quantity. Examples of acids that are suitable include hydrochloric acid, sulfuric acid, acetic acid and the like. The acid form of the polyhydropolyborate anion may itself be used.

The hydrolysis (or alcoholysis) of the polyhydropolyboric acid compound-catalyst compositions of this invention yields hydrogen and boric acid or borates. As shown in the examples and in the following representative equations, the quantity of hydrogen evolved is characteristic of the specific anion and is independent of the cation and the pH.

(1) $H_2B_{10}H_{10} + 30H_2O \rightarrow 21H_2 + 10H_3BO_3$
(2) $(NH_4)_2B_{10}H_{10} + 2HCl + 30H_2O \rightarrow 21H_2 + 10H_3BO_3 + 2NH_4Cl$
(3) $(NH_4)_2B_{10}H_{10} + 30C_2H_5OH \rightarrow 2NH_3 + 21H_2 + 10B(OC_2H_5)_3$
(4) $H_2B_{12}H_{12} + 36H_2O \rightarrow 25H_2 + 12H_3BO_3$
(5) $Na_2B_{12}H_{12} + 2HCl + 36H_2O \rightarrow 25H_2 + 12H_3BO_3 + 2NaCl$
(6) $Na_2B_{12}H_{12} + 31H_2O \rightarrow 25H_2 + 8H_3BO_3 + Na_2B_4O_7$
(7) $H_2(B_{12}H_6Br_6) + 36H_2O \rightarrow 19H_2 + 6HBr + 12H_3BO_3$
(8) $[N(CH_3)_4]_2B_{10}H_9(OH) + 24H_2O \rightarrow 20H_2 + [N(CH_3)_4]_2B_4O_7 + 6H_3BO_3$
(9) $NaB_{11}H_{14} + 32H_2O \rightarrow 24H_2 + 10H_3BO_3 + NaBO_2$
(10) $Zn(NH_3)_4B_{11}H_{13} + 6HCl + 33H_2O \rightarrow 24H_2 + ZnCl_2 + 4NH_4Cl + 11H_3BO_3$
(11) $[N(CH_3)_4]_2B_{20}H_{18} + 58H_2O \rightarrow 40H_2 + 2[N(CH_3)_4]BO_2 + 18H_3BO_3$
(12) $H_4B_{20}H_{18} + 60H_2O \rightarrow 41H_2 + 20H_3BO_3$ The form in which the boron is found after hydrolysis depends upon pH and other factors. Under certain conditions the boron is found in the form of an ester, e.g., triethyl or tri(t-butyl) borate. This invention is not limited to the particular compounds or ratios of boric acid to borate shown in the above equations.

The Group VIII metals and their compounds used as catalysts in the compositions and process of this invention are conventional hydrogenation catalysts or their precursors and they are prepared by well-known methods. These particular catalysts are essential for hydrolysis of the polyhydropolyboric acid compounds. Aqueous solutions of the polyhydropolyboric acid compounds can be stored indefinitely at room temperature. Addition of a strong, non-oxidizing acid, e.g., hydrochloric acid, to such aqueous solutions does not cause hydrolysis. However, when a catalyst of the type defined above is added to the acidified solution, immediate liberation of hydrogen takes place.

The polyhydropolyboric acids, their salts, and their substitution derivatives used in the compositions and the process of this invention can be prepared by various methods. Specific procedures are described below.

Amine salts of the $B_{10}H_{10}{-2}$ anion can be prepared by reaction of two moles of ammonia or primary, secondary, or tertiary alkylamine with one mole of a decaboryl bis(alkyl sulfide), e.g., decaboryl bis(dimethyl sulfide), at a temperature between about −50° and 100° C. The preparation of amine salts of this type is described in greater detail in U.S. applications Serial Nos. 6,853 and 6,854, filed February 5, 1960, by W. H. Knoth, Jr.

The decaboryl bis(alkyl sulfide) precursors can be prepared by reaction of one mole of decaborane with two moles of a dialkyl sulfide at a temperature between 0° and 100° C. as described in greater detail in U.S. application Serial No. 750,862, filed July 25, 1958, by E. L. Muetterties.

Aqueous solutions of decahydrodecaboric acid $(H_2{++}B_{10}H_{10}{--}$ or the hydronium form $(H_3O)_2{++}B_{10}H_{10}{--})$ are prepared by contacting an aqueous solution of a salt of decahydrodecaboric acid (e.g., an anionic salt prepared as described above) with a strongly acidic cation exchange resin, for example, a cation exchange resin of the sulfonic acid variety such as those commercially available as "Amberlite" IR–120-H and "Dowex" 50. This process is described in greater detail in U.S. application Serial No. 6,855, filed February 5, 1960, by W. H. Knoth, Jr.

Metal salts of the decahydrodecaboric acid anion can be prepared in a variety of ways. For example, the aqueous acid may be neutralized to a pH of about 7 with an aqueous dispersion (i.e., a solution or suspension) of an inorganic base containing the desired metal, such as an alkali or alkaline earth metal hydroxide. The resulting solution of the metal salt of the $B_{10}H_{10}{--}$ anion may be concentrated by evaporation of water to dryness or, if desired, until the salt crystallizes out. In a second method, metal salts can be prepared by reaction of a decaboryl bis(alkyl sulfide) with an inorganic base in aqueous, alcoholic, or aqueous-alcoholic solution at temperatures ranging from room temperature up to 100° C. A third way of preparing metal salts of the decahydrodecaborate anion is a metathetic reaction which involves adding a solution of the decahydrodecaboric acid, or of a soluble salt of this acid, e.g., the ammonium salt, to a solution of a soluble salt of that metal whose decahydrodecaborate (−2) salt is desired under such conditions that the desired salt precipitates. The preparation of metal salts of the decahydrodecaborate anion is described in greater detail in the above-mentioned U.S. application Serial No. 6,855, of W. H. Knoth, Jr.

Alkali metal and alkaline earth metal salts of the dodecahydrododecaborate (−2) anion, i.e., compounds of the formula $M'_aB_{12}H_{12}$, wherein $M'$ is an alkali or alkaline earth metal and $a$ is 1 or 2 and is 2 when $M'$ is an alkali metal and is 1 when $M'$ is an alkaline earth metal, can be prepared by reacting diborane, $B_2H_6$, with an alkali metal or alkaline earth metal borohydride, $M'(BH_4)_x$, where $x$ is 1 or 2 and represents the valence of $M'$, under superatomspheric pressure in the substantial absence of moisture and at a temperature of 100° C. or more for several hours. Optionally, the process is carried out in the presence of an inert solvent, e.g., 1,2-dimethoxyethane. This process is described in greater detail in U.S. application Serial No. 30,442, filed May 20, 1960, by H. C. Miller and E. L. Muetterties.

The alkali metal and alkaline earth metal salts of the dodecahydrododecaborate (−2) anion can be used to prepare other salts by simple metathetic reactions to effect an exchange of cation. Thus, disodium dodecahydrododecaborate can be reacted with ammonium sulfate, pyridinium chloride, morpholinium sulfate, and silver nitrate in aqueous or non-aqueous solution (e.g., methanol) to form dodecahydrododecaborates having as cations ammonium, pyridinium, morpholinium, and silver.

The free dodecahydrododecaboric acid, $H_2B_{12}H_{12}$, can be prepared by contacting an aqueous solution of an alkali metal or alkaline earth metal salt of the dodecahydrododecaborate anion with a strongly acidic cation exchange resin. To illustrate, an aqueous solution of disodium dodecahydrododecaborate is passed through a column packed with "Amberlite" IR-120-H, a strongly acidic resin of the sulfonic acid variety. The eluent, which contains the acid $H_2B_{12}H_{12}$, is evaporated under reduced pressure to obtain the hydrated acid in the form of a white crystalline solid.

Alkali metal and alkaline earth metal salts of the $B_{11}H_{14}$ (−1) anion can be prepared by reaction of decaborane with an alkali metal or alkaline earth metal borohydride in solution in an ether at a temperature of at least 25° C. In this reaction preferred ethers include ethylene glycol dimethyl ether and diethylene glycol dimethyl ether. The reaction is preferably carried out at a temperature between 65° and 100° C.

Salts of the $B_{11}H_{14}^-$ anion with metals other than alkali and alkaline earth metals and with ammonium and substituted ammonium radicals can be prepared by simple metathetical reaction in a manner similar to that used for the preparation of similar salts of the $B_{10}H_{10}^{-2}$ and $B_{12}H_{12}^{-2}$ anions. The preparation of various salts of the $B_{11}H_{14}^-$ anion is described in greater detail in U.S. application Serial No. 20,835, filed April 8, 1960, by V. D. Aftandilian, and now abandoned but refiled as Serial No. 245,463 on December 18, 1962.

Salts of the $B_{11}H_{13}^{-2}$ anion can be prepared by treatment of an alkali metal salt of the $B_{11}H_{14}^-$ anion prepared as described above, with a strong base. Thus, an aqueous solution of sodium tetradecahydroundecaborate (−1) can be mixed with a molar solution of zinc chloride in 10 molar aqueous ammonium hydroxide to give a white solid precipitate. This product, which is tetramminezinc tridecahydroundecaborate, can be purified by crystallization from dilute ammonium hydroxide and has the formula $[Zn(NH_3)_4]^{+2}B_{11}H_{13}^{-2}$. This process is described in U.S. application Serial No. 38,099, filed June 23, 1960, by H. C. Miller and E. L. Muetterties.

Compounds having the $B_{20}H_{18}^{-2}$ anion can be prepared by oxidation of compounds having the $B_{10}H_{10}^{-2}$ anion. Oxidation can be accomplished either chemically or electrolytically. In chemical oxidation the oxidizing agent, or oxidant, is a compound having as a characteristic component a metal of variable valence, which metal is in its highest valence state, said compound having an oxidation-reduction potential in acid solution of about −1.33 to about −1.61 volts. The oxidation is conveniently carried out by adding the oxidant, e.g., a dichromate, a higher oxide of lead, a permanganate, a higher oxide of bismuth or a salt of tetravalent cerium to a solution of the $B_{10}H_{10}^{-2}$ compound in a solvent, e.g., water, methanol, and the like, at temperatures between 0° and 100° C., preferably between 10° and 75° C. The reaction is continued until evolution of hydrogen ceases. A solution containing a desired cation is added to the resulting reaction mixture whereupon the corresponding salt of the $B_{20}H_{18}^{-2}$ anion may precipitate. If precipitation does not occur, the solution can be evaporated to a volume at which the salt separates.

In the electrolytic oxidation process, the decahydrodecaborate (−2) salt is dissolved in a liquid solvent which has no tendency to release or accept protons, e.g., nitriles, quaternary nitrogen bases, and the like. An electric current is then passed through the solution. A current of at least 1 ampere and at least 1 volt is usually satisfactory, and the process is carried out at atmospheric or higher temperature until the evolution of hydrogen ceases. The salt may be isolated in the manner described above. Methods for the preparation of $B_{20}H_{18}^{-2}$ compounds are described in greater detail in U.S. application Serial No. 199,573, filed May 31, 1962, by E. L. Muetterties.

Salts of the $B_{20}H_{18}^{-4}$ anion are readily prepared by reaction of salts of the $B_{20}H_{18}^{-2}$ anion with strong bases. The reaction is conveniently carried out in water to which water-miscible organic solvents can be added, if desired, to increase solubility. The salt of the $B_{20}H_{18}^{-2}$ anion and the strong base are dissolved and heated with stirring until the solution is colorless. Any salt of the $B_{20}H_{18}^{-2}$ anion can be used but as a matter of convenience the alkali metal, alkaline earth metal or substituted ammonium salts are preferred. Strong bases that are useful in this process are those which are equivalent in strength to an alkali metal hydroxide. Examples include alkali metal hydroxides, alkaline earth metal hydroxides and aralkyl or lower alkyl quaternary ammonium hydroxides. Sufficient base is used to maintain the reaction mixture alkaline. The reaction proceeds at normal atmospheric temperature but it is preferred to heat the mixture, e.g., to its boiling point, to increase the rate of the reaction. The resulting solution can then be reacted with an aqueous solution of a salt containing the cation that is desired in the final product. The $B_{20}H_{18}^{-4}$ salt may precipitate and be separated at this point or the solution can be evaporated to a volume where separation of the salt of the tetravalent anion occurs. This process is described in greater detail in the above-mentioned U.S. application Serial No. 199,573 of E. L. Muetterties.

Substituted polyhydropolyboric acid compounds, i.e., compounds of the formula $M_a(B_xH_{y-z}X_z)_b$ in which z is at least 1, are prepared by employing the following reactants:

(a) A compound of formula $M_a(B_xH_{y-z}X_z)_b$ bearing at least one hydrogen bonded to boron, and (b) a reagent capable of introducing a monovalent substituent, called herein an electrophilic group, into a benzene nucleus by replacement of hydrogen bonded to a carbon of said nucleus. This reactant is referred to as an electrophilic reagent. For preparation of compounds which bear two or more X groups which are different, e.g., —SCH₃ and Cl, a compound of formula $M_a(B_xH_{y-z}X_z)_b$ can be employed as the boron-containing reactant which contains at least one hydrogen and at least one X group bonded to boron atoms.

Electrophilic reagents are compounds which react by acquiring electrons or acquiring a share in electrons which previously belonged to a foreign molecule. Examples of electrophilic reagents which can be used to prepare the substituted polyhydropolyboric acid compounds used as starting materials in this invention are listed in the following table together with the substituent group which in the process is bonded to boron in the final product.

| Electrophilic Reagent | Electrophilic Group Bonded to Boron |
| --- | --- |
| Halogens (F₂, Cl₂, Br₂, I₂) | Halogens (F, Cl, Br, I). |
| Olefins | —Alkyl [e.g., —C₂H₅, —C(CH₃)₃, —CH(CH₃)(C₆H₅)]. |
| Alkyl halides | —Alkyl. |
| Acyl halides | $-\overset{O}{\underset{\|}{C}}-$ monovalent hydrocarbon. |
| (R″OR″·H)⁺Cl⁻ (oxonium salt) | —OR″. |
| (R″OH₂)⁺Cl⁻ (oxonium salt) | —OH. |
| (H₃O)⁺Cl⁻ (hydronium salt) | —OH. |

In the above groups, R″ is an organic radical, preferably hydrocarbon of at most 18 carbons, which can be alkyl, alkenyl, cycloalkyl, cycloalkenyl, aryl, alkaryl, aralkyl, and the like.

Reaction of the boron compounds with the electrophilic reagent is conducted in conventional corrosion-resistant reaction vessels, e.g., glass. The boron-containing reactant, optionally in an inert liquid solvent, is charged into the vessel and the electrophilic reactant is then supplied at a temperature and at a rate which provides a controllable reaction and which brings the reaction to completion within a reasonable time. When electrophilic reagents are employed which are hydrolytically stable, water or aqueous alcohol can frequently be used as solvents. Other solvents can also be used, e.g., diethyl ether, benzene, carbon tetrachloride, etc. The temperature at which the reaction is carried out is determined largely by the reactivity of the electrophilic reagent, and temperatures between about 0° and 150° C. are generally preferred. The reaction proceeds satisfactorily at atmospheric pressure but superatmospheric pressure can be employed if desired. The proportions in which the reactants are used may be varied in accordance with the desired degree of substitution. It is usually desirable to use at least one mole of the electrophilic reagent for each hydrogen which is to be replaced on the boron-containing reactant. Reaction products can be purified in conventional manner, for example, by crystallization from water or inert organic solvents. This process is described in greater detail in U.S. applications Serial No. 135,710, filed August 24, 1961 by W. H. Knoth, Jr., and now abandoned but refiled as Serial No. 237,392 on November 13, 1962, and Serial No. 141,248, filed September 25, 1961, by H. C. Miller and E. L. Muetterties and now abandoned but refiled as Serial No. 246,636 on December 26, 1962.

The compositions of this invention and their hydrolysis are described in greater detail in the following examples in which proportions are expressed in parts by weight unless otherwise specified.

EXAMPLE 1

Solid sodium dodecahydrododecaborate hydrate (4.48 g.) and platinum black (0.224 g.) are mixed in a dry box by means of a mortar and pestle. There is no evidence of hydrogen evolution when the mixture is stored in a closed container for three days.

When hydrogen is needed, the above composition is added to 100 ml. of water and the resulting slurry is heated to reflux temperature. Approximately 12.5 liters of hydrogen (theory=11.2 liters for the dihydrate) is evolved in about 1.5 hours. The hydrogen is suitable for chemical use.

EXAMPLE 2

A mixture of 4.48 g. of sodium dodecahydrododecaborate hydrate and 0.896 g. of a nickel-on-kieselguhr catalyst (containing 25.96% of reduced nickel by weight) is prepared as described in Example 1 and stored in a closed container. After three days there is no evidence of hydrogen evolution.

As in Example 1 the dry mixture of the polyhydropolyborate and catalyst may be used for generation of hydrogen at any desired time. For example, it is placed in 100 ml. of water, and the slurry is boiled for a period of 77 hours. Approximately 11.3 liters of hydrogen is obtained (theory=11.2 liters for the dihydrate).

When the polyhydropolyborate is to be used immediately for generation of hydrogen, it is not necessary to prepare a dry mixture of it with the catalyst, but merely to add the catalyst to it in aqueous dispersion or solution. The rate of hydrogen evolution depends on the particular boron compound and the particular catalyst and its concentration. Rapid hydrogen evolution begins immediately on adding the catalyst to a dispersion of the most reactive polyhydropolyborates. With less reactive compositions, hydrogen evolution is slower and begins after the mixture is heated or acidified.

EXAMPLE 3

To a solution of 0.03 mole of diammonium decahydrodecaborate in 250 ml. of water is added 1.0 g. of 10% palladium-on-carbon catalyst, whereupon hydrogen is evolved at an appreciable rate. After one hour, 0.06 mole of hydrogen chloride is added (as hydrochloric acid) whereupon the rate of hydrogen evolution increases. Hydrogen evolution continues for 4 days at which time the reaction is rapidly completed by brief warming on a steam bath. Ammonium chloride and boric acid are identified in the reaction product.

EXAMPLE 4

A slightly alkaline solution (pH=8) of 2.2 g. of sodium dodecahydrododecaborate dihydrate $$(Na_2B_{12}H_{12} \cdot 2H_2O)$$

in 40 ml. of water is stirred with 0.3 g. of freshly reduced platinum oxide. Very little reaction takes place while the mixture is warmed to 50° C. The mixture is then cooled to room temperature and a few drops of hydrochloric acid are added to produce a pH of 3 whereupon vigorous reaction takes place and 1.75 liters of gas, presumably hydrogen, is evolved over 2 hours. At the end of this time the gas evolution has slowed up and the reaction mixture has a pH of 4. Another 1.0 g. of concentrated hydrochloric acid is added to the mixture (which produces a pH of 2) and 0.7 liter of gas is evolved over the next 3 hours. A white solid which has formed in the reaction mixture is collected and it amounts to 1.8 g. This solid is identified as boric acid. Partial evaporation of the filtrate gives another 1.8 g. of boric acid. The total boric acid obtained amounts to 46% of the theoretical. Treatment of the filtrate with tetramethylammonium chloride gives a precipitate of tetramethylammonium dodecahydrodecaborate, since reaction is incomplete.

EXAMPLE 5

Platinum oxide (0.5 g.) mixed with 100 ml. of water is reduced by pressuring with hydrogen in a Parr bomb. To the resulting suspension there is added 3.5 g. of a substituted dodecahydrododecaborate of the formula

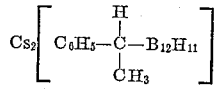

and the mixture is heated at reflux for 3 hours. During this heating there is foaming and evolution of gas. From the cooled reaction mixture there is isolated by continuous ether extraction boric acid melting at 138–142° C. There is also isolated from the reaction mixture a further yield of crystals of boric acid, which is identified by the infrared absorption spectra. There is also isolated a high melting solid which is believed to be cesium borate.

In addition to the above examples describing some of the compositions and some of the hydrolysis methods the following examples in Table I list other specific polyhydro-polyboric acid compounds and other Group VIII metal catalysts that are operable in this invention.

*Table I*
HYDROLYSIS OF POLYHYDROPOLYBORIC ACID COMPOUNDS

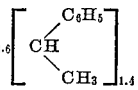

Table I—Continued

| Example No. | Polyhydropolyboric Acid Compound | Catalyst | Reaction Conditions and Results |
|---|---|---|---|
| 17 | $Na_2B_{12}H_{12}$ | Ru-on-charcoal | Aqueous medium at reflux temperature slowly evolved hydrogen. Boric acid isolated. |
| 18 | $Na_2B_{12}H_{12}$ | $H_2PtCl_6$ | Acidified aqueous medium. Rapid hydrogen evolution. |
| 19 | $Na_2B_{12}H_{12}$ | $RhCl_3$ | Aqueous medium. Vigorous hydrogen evolution, and boric acid isolated. |
| 20 | $Cs_2B_{12}H_{11}O(CH_2)_3CH_3$ | Pt black | Aqueous medium heated at reflux. Hydrogen evolved and n-butyl alcohol isolated. |
| 21 | $Cs_2B_{12}H_6Br_6$ | Pt black | Acidified aqueous medium heated to reflux. Hydrogen evolved in theoretical quantities in 1.5 hours. |
| 22 | $Cs_2(B_{12}H_{11}OCH_2CH_2OCH_3)$ | Pt black | Acidified, warm aqueous medium. |
| 23 | $Cs_2\left[B_{12}H_{10.6}\left(C\overset{C_6H_5}{\underset{CH_3}{\diagup\!\!\!\diagdown}}H\right)_{1.4}\right]$ | Pt black | Acidified, warm aqueous medium. Quantitative hydrolysis. |
| 24 | $(H_3O)_2\left[B_{12}H_6\left(C\overset{CH_3}{\underset{CH_3}{\diagup\!\!\!\diagdown}}-C_8H_{15}\right)_6\right]$ | $PtO_2$ | Water-dioxane (2:1) at 90–110° C., under autogenous pressure. |
| 25 | $[(CH_3)_4N]_2B_{20}H_{18}$ | Pt black | Quantitative evolution of hydrogen in 4N aqueous HCl. |
| 26 | $[(CH_3)_4N]_{2.5}(H_3O)_{1.5}B_{20}H_{18}$ | Pt black | Quantitative evolution of hydrogen in aqueous medium at reflux temperature during 20 min. |

EXAMPLE 27

Platinum black (0.5 g.) is added to a nitrogen-blanketed solution of 4.63 g. (0.03 mole) of $(NH_4)_2B_{10}H_{10}$ in 300 ml. of absolute ethyl alcohol and the mixture is refluxed (80° C.) for 21.5 hours. Gas evolution is measured by means of a wet test meter. This presumably measures the volume of hydrogen, and the ammonia evolved in the reaction is simply dissolved in the water therein. The amount of hydrogen measured is 16.02 liters which, after correction to 0° C. and 760 mm., is 14.22 liters (theory equals 14.11 liters). The reaction product distills almost completely at 76.7° C. leaving little or no residue. This distillate is evidently an azeotrope of triethyl borate with ethyl alcohol. The distillate yields large quantities of boric acid (identified by its infrared absorption spectrum) upon slow evaporation in undried air at room temperature.

EXAMPLE 28

The procedure of Example 27 is repeated with the exception that 314 ml. of t-butyl alcohol is substituted for the absolute ethyl alcohol of that example. The mixture is refluxed (87° C.) for 30 hours and during this time 15.79 liters (uncorrected) of ammonia-free hydrogen is measured by the wet test meter. The liquid reaction mixture is distilled and after removing 205 ml. of t-butyl alcohol, there is obtained 61 ml. of tri(t-butyl) borate boiling at 172° C. at atmospheric pressure. A small amount of liquid and a white solid residue remain in the distillation flask.

The polyhedral boron hydride/catalyst compositions of this invention are especially useful as concentrated sources of hydrogen. Because of their stability, these dry compositions can be stored until free hydrogen is desired, then added to water or an alcohol to liberate the hydrogen. The polyhedral boron hydride compositions of this invention also have a weight advantage over the hitherto known borohydrides as sources of hydrogen. For example, only 8.96 g. of sodium dodecahydrododecaborate dihydrate ($Na_2B_{12}H_{12}\cdot 2H_2O$) is required to produce one mole of hydrogen whereas 9.48 g. of sodium borohydride ($NaBH_4$) is required to produce one mole of hydrogen. The dry mixtures of the polyhedral boron hydride compound and catalyst can be compressed into pellets or tablets for ease of handling and storing prior to use in the generation of hydrogen.

When water is employed as hydrolyzing agent the process of this invention provides a convenient method for generating pure hydrogen for laboratory or commercial use. It is especially convenient since hydrogen can be generated simply by adding water to the preformed dry mixture of the polyhydropolyboric acid compound and catalyst, or by adding the catalyst to an aqueous dispersion of the polyhydropolyboric acid compound. When an alcohol is used as hydrolyzing agent and an ammonium polyhydropolyborate is used, the hydrogen produced is mixed with ammonia, which is easily removed if pure hydrogen is desired. The hydrogen-ammonia mixture obtained under such conditions can be used directly when a source of hydrogen and ammonia is desired, for example, in the treatment of catalysts.

The process of this invention is also of practical value in quantitative analytical chemistry. It provides a convenient method for converting the boron in polyhedral boron hydride anions into a chemical form amenable to orthodox analytical procedures. This is illustrated in the following Table II listing several polyhydropolyboric acid salts and the analytical results obtained by a method comprising catalytically hydrolyzing the polyhedral boron anions by platinum black in warm aqueous hydrochloric acid solution to form boric acid or a borate, the amount of which is then determined in conventional manner by titration as the mannitol complex.

Table II

| Substance Analyzed | Percent Boron | |
|---|---|---|
|  | Theory | Found |
| $Cs_2B_{12}H_{12}$ | 31.9 | 31.26 |
| $[(CH_3)_4N]_2B_{20}H_{18}$ | 56.54 | 53.79 |
| Deuterated $Cs_2B_{12}H_{12}$ | 31.0 | 30.53 |
| $[(C_2H_5)_3NH]B_{11}H_{14}$ | 50.6 | 50.29 |
| $[(CH_3)_3NH]B_{11}H_{14}$ | 61.7 | 61.57 |

The process of this invention also provides a convenient method for destroying polyhydropolyborate anions which frequently interfere during the quantitative determination of associated cations.

The process of this invention is also useful in the operation of primary electrochemical cells employing polyhydropolyborate anions having at least 10 boron atoms as the anodic component or fuel. Primary electrochemical cells of this type are being claimed in U.S. application Serial No. 208,648, filed herewith by Philip E. Lindvig.

Since obvious modifications and equivalents in the invention will be evident to those skilled in the chemical arts, I propose to be bound solely by the appended claims.

The embodiments of the invention in which an exclusive property or privilege is claimed are defined as follows:

1. A mixture capable of generating hydrogen upon addition of a member of the group consisting of water and liquid alcohols, the active ingredients of which consist essentially of (a) at least one polyhedral boron compound of the formula $M_aQ_b$, wherein M is a cation of valence 1–3 and Q is a boron-containing anion of the formula $(B_xH_{y-z}X_z)$, $a$ is a positive whole number between 1 and 4 inclusive, and $b$ is a positive whole number between 1 and 3 inclusive, $x$ and $y$ are positive numbers of at least 10, $z$ is a number between 0 and 6 inclusive, and the sum of $x$, $y$ and the valence of Q is a positive even number, and X is selected from the group consisting of halogen, hydroxyl and alkyl and aralkyl of 1–11 carbons, and (b) a catalytic amount of at least one metal of Group VIII of the Periodic Table having an atomic number between 28 and 78, inclusive.

2. A mixture of claim 1 wherein the polyhedral boron compound comprises the boron-containing anion $(B_{10}H_{10})^{-2}$.

3. A mixture of claim 1 wherein the polyhedral boron compound comprises the boron-containing anion $(B_{12}H_{12})^{-2}$.

4. A mixture of claim 1 wherein the polyhedral boron compound comprises the boron-containing anion $(B_{11}H_{14})^{-1}$.

5. A mixture of claim 1 wherein the polyhedral boron compound comprises the boron-containing anion $(B_{11}H_{13})^{-2}$.

6. A mixture of claim 1 wherein the polyhedral boron compound comprises the boron-containing anion $(B_{20}H_{18})^{-2}$.

7. A mixture of claim 1 wherein the polyhedral boron compound comprises the boron-containing anion $(B_{20}H_{18})^{-4}$.

8. A mixture comprising a dodecahydrododecaborate and metallic platinum.

9. A mixture comprising a dodecahydrododecaborate and metallic nickel.

10. A mixture comprising a decahydrodecaborate and metallic palladium.

11. The process for generating hydrogen which comprises reacting with at least one member of the class consisting of water and liquid alcohols at least one polyhedral boron compound of the formula $M_aQ_b$, wherein M is a cation of valence 1–3 and Q is a boron-containing anion of the formula $(B_xH_{y-z}X_z)$, $a$ is a positive whole number between 1 and 4 inclusive, and $b$ is a positive whole number between 1 and 3 inclusive, $x$ and $y$ are positive numbers of at least 10, $z$ is a number between 0 and 6 inclusive, and the sum of $x$, $y$ and the valence of Q is a positive even number, and X is selected from the group consisting of halogen, hydroxyl and alkyl and aralkyl of 1–11 carbons, in the presence of a catalytic amount of at least one member of the group consisting of metals of Group VIII of the Periodic Table having an atomic number between 28 and 78, inclusive, and acids, salts and oxides of these metals.

12. The process of claim 11 wherein the polyhedral boron compound comprises the boron-containing anion $(B_{10}H_{10})^{-2}$.

13. The process of claim 11 wherein the polyhedral boron compound comprises the boron-containing anion $(B_{12}H_{12})^{-2}$.

14. The process of claim 11 wherein the polyhedral boron compound comprises the boron-containing anion $(B_{11}H_{14})^{-1}$.

15. The process of claim 11 wherein the polyhedral boron compound comprises the boron-containing anion $(B_{11}H_{13})^{-2}$.

16. The process of claim 11 wherein the polyhedral boron compound comprises the boron-containing anion $(B_{20}H_{18})^{-2}$.

17. The process of claim 11 wherein the polyhedral boron compound comprises the boron-containing anion $(B_{20}H_{18})^{-4}$.

18. The process for generating hydrogen which comprises reacting with water a dodecahydrododecaborate in the presence of a catalytic amount of platinum.

19. The process for generating hydrogen which comprises reacting with water a dodecahydrododecaborate in the presence of a catalytic amount of nickel.

20. The process for generating hydrogen which comprises reacting with water a decahydrodecaborate in the presence of a catalytic amount of palladium.

21. The process for generating hydrogen which comprises reacting with ethanol a decahydrodecaborate in the presence of a catalytic amount of platinum.

22. The process for generating hydrogen which comprises reacting with t-butyl alcohol a decahydrodecaborate in the presence of a catalytic amount of platinum.

References Cited in the file of this patent

UNITED STATES PATENTS

| | | |
|---|---|---|
| 2,885,277 | Fitzpatrick | May 5, 1959 |
| 2,935,428 | Huff | May 3, 1960 |
| 2,937,824 | Krumbholy et al. | May 24, 1960 |
| 2,946,664 | Klien et al. | July 26, 1960 |
| 3,032,399 | Hoke | May 1, 1962 |
| 3,053,899 | Solomon | Sept. 11, 1962 |
| 3,071,440 | Boone | Jan. 1, 1963 |